United States Patent [19]
Michaels

[11] 3,962,748
[45] June 15, 1976

[54] TV CONTROL DEVICE
[75] Inventor: Chris T. Michaels, New York, N.Y.
[73] Assignee: The Raymond Lee Organization, Inc., New York, N.Y. ; a part interest
[22] Filed: Mar. 24, 1975
[21] Appl. No.: 561,101

[52] U.S. Cl. .............................. 16/114 R; 74/10 A; 74/553; 16/115
[51] Int. Cl.² .......................................... E05B 1/00
[58] Field of Search............. 16/115, 114 R; 74/553, 74/504, 10 A; 403/104, 109, 106, 107, 108

[56] References Cited
UNITED STATES PATENTS

| | | | |
|---|---|---|---|
| 1,278,100 | 9/1918 | Braning | 403/108 |
| 2,036,948 | 4/1936 | McNary | 74/504 |
| 2,337,970 | 12/1943 | Cassell | 403/109 |
| 2,853,897 | 9/1958 | Loewy | 74/507 |
| 3,076,263 | 2/1963 | Musto | 403/104 |
| 3,336,060 | 8/1967 | Bradford | 403/108 |
| 3,453,011 | 7/1969 | Meinunger | 403/104 |

Primary Examiner—Andrew V. Kundrat
Attorney, Agent, or Firm—Daniel Jay Tick

[57] ABSTRACT

A rod-like member of variable adjustable length has a handle at one end. A head part at the opposite end of the member cooperates with the dial of a TV set in a manner whereby a user in an area distant from the set selectively rotates the dial via the member.

2 Claims, 6 Drawing Figures

U.S. Patent  June 15, 1976  3,962,748
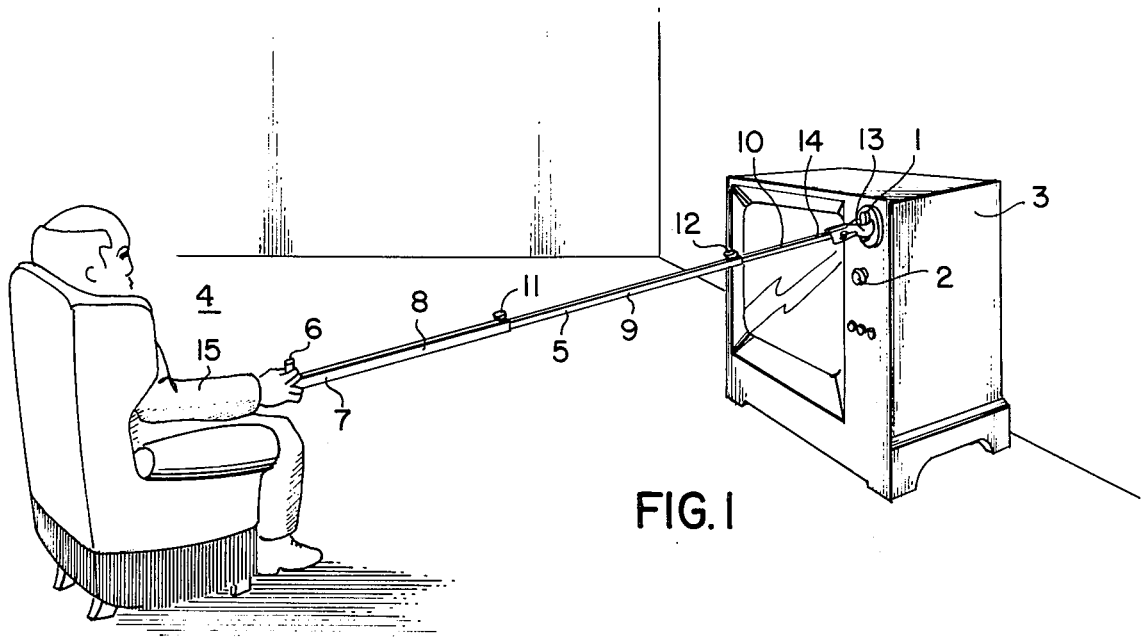
FIG.1
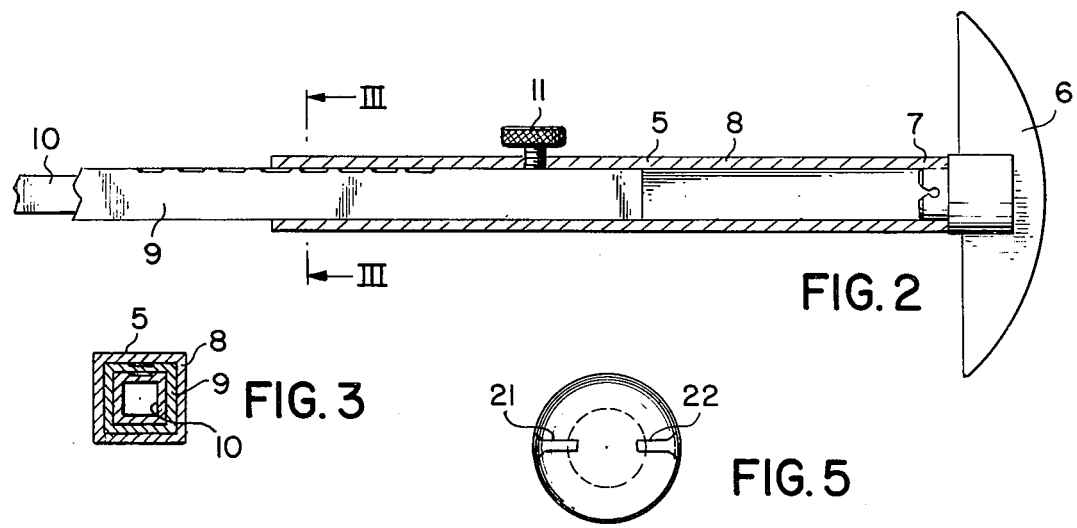
FIG.2
FIG.3
FIG.5
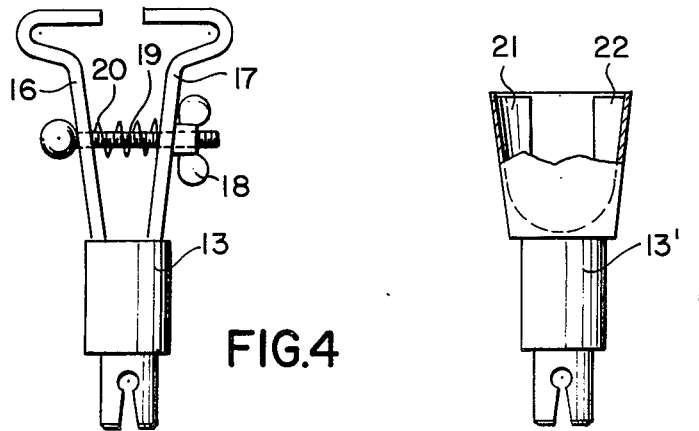
FIG.4
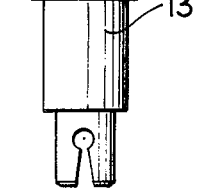
FIG.6

TV CONTROL DEVICE

DESCRIPTION OF THE INVENTION

The present invention relates to a TV control device. More particularly, the invention relates to a TV control device for rotating a dial of a TV set from an area distant from the set.

Objects of the invention are to provide a TV control device of simple structure, which is inexpensive in manufacture, utilized with facility and convenience, considerably less expensive than its electrical and electronic counterparts, and functions efficiently, effectively and reliably to selectively rotate a dial of a TV set from an area distant from the set.

In order that the invention may be readily carried into effect, it will now be described with reference to the accompanying drawing, wherein:

FIG. 1 is a schematic diagram of an embodiment of the TV control device of the invention in use;

FIG. 2 is a view, partly in section, of part of the rod-like member of the TV control device of the invention;

FIG. 3 is a cross-sectional view, taken along the lines III—III, of FIG. 2;

FIG. 4 is a view, on an enlarged scale, of an embodiment of the head part of the TV control device of the invention;

FIG. 5 is an axial view, on an enlarged scale, of another embodiment of the head part of the TV control device of the invention;

FIG. 6 is a partially cutaway view, on an enlarged scale, of the embodiment of FIG. 5 of the head part of the TV control device of the invention.

In the FIGS., the same components are identified by the same reference numerals.

The TV control device of the invention is for rotating a dial 1 or 2 of a TV set 3 from an area 4 distant from the set, as shown in FIG. 1.

The TV control device of the invention comprises a rod-like member 5 (FIGS. 1, 2 and 3) of variable adjustable length having a handle 6 (FIGS. 1 and 2) at one end 7. The rod-like member 5 comprises a plurality of telescoped sections 8, 9 and 10 (FIGS. 1, 2 and 3) and fasteners of any suitable type, such as, for example, knurled-headed bolts 11 and 12 (FIG. 1) threadedly coupled in bores formed through the sections, for releasably affixing the sections in position relative to each other. Each of the sections of the rod-like member 5 is preferably, but not necessarily, of substantially hollow rectangular configuration. Each of the sections of the rod-like member 5 is preferably, but not necessarily, perforated, as shown in FIG. 2, in order to save material and weight.

A head part 13 (FIGS. 1 and 4) or 13' (FIG. 6) is provided at the opposite end 14 (FIG. 1) of the rod-like member. The head part 13 or 13' cooperates with the dial 1 or 2, respectively, of the TV set 3 in a manner whereby a user 15 in an area 4 distant from the set selectively rotates the dial via the rod-like member.

In the embodiment of FIG. 4, the head part 13 comprises a pair of spaced spring-like clamping heads 16 and 17 for gripping the dial 1 between them. The space between the clamping heads 16 and 17 is adjusted via a wing nut 18 on a bolt 19 passing between and through the clamping heads. A spring 20 is mounted around the bolt 19 between the clamping heads 16 and 17 and maintains the space between the heads.

In the embodiment of FIGS. 5 and 6, the head part 13' has a pair of opposite radially extending ears 21 and 22 cooperating with and releasably accommodated in a pair of opposite radially extending slots formed in the dial 2.

The manipulation of odd-shaped dials by the TV control device of the invention may be facilitated by the use of suitably shaped accessories affixed to desired dials of the TV set.

While the invention has been described by means of specific examples and in specific embodiments, I do not wish to be limited thereto, for obvious modifications will occur to those skilled in the art without departing from the spirit and scope of the invention.

I claim:

1. A TV control device for rotating a dial of a TV set, from an area distant from the set, said TV control device comprising a rod-like member of variable adjustable length having a handle at one end, said rod-like member being independent from a TV set and comprising a plurality of telescoped sections and fastening means for releasably affixing the sections in position relative to each other, each of the sections of the rod-like member being of substantially hollow rectangular configuration;

a head part detachably secured at the opposite end of the rod-like member for cooperating with the dial of a TV set in a manner whereby a user in an area distant from the set selectively rotates the dial via the rod-like member, said head part being independent from a TV set but removably coupleable to a dial thereof and comprising a pair of spaced spring-like clamping heads for gripping the periphery of a dial, and a second detachable head post having a pair of opposed radially extending flat ears for cooperating with the slots of a dial.

2. A TV control device as claimed in claim 1, wherein the sections of the rod-like member are perforated.

* * * * *